(12) United States Patent
Kinder et al.

(10) Patent No.: US 9,961,107 B2
(45) Date of Patent: May 1, 2018

(54) SYSTEM AND METHOD FOR DETECTING AND MONITORING PERSISTENT EVENTS

(71) Applicant: SecureWorks Corp., Wilmington, DE (US)

(72) Inventors: Ross R. Kinder, Ann Arbor, MI (US); Aaron Hackworth, Johns Creek, GA (US); Matthew K. Geiger, Austin, TX (US); Kevin R. Moore, New Hartford, NY (US); Timothy M. Vidas, Omaha, NE (US)

(73) Assignee: SECUREWORKS CORP., Wilmington, DE (US)

( * ) Notice: Subject to any disclaimer, the term of this patent is extended or adjusted under 35 U.S.C. 154(b) by 4 days.

(21) Appl. No.: 15/436,304

(22) Filed: Feb. 17, 2017

(65) Prior Publication Data

US 2017/0243005 A1 Aug. 24, 2017

Related U.S. Application Data

(60) Provisional application No. 62/297,612, filed on Feb. 19, 2016.

(51) Int. Cl.
| | | |
|---|---|---|
| *H04L 29/06* | (2006.01) | |
| *G06F 21/55* | (2013.01) | |
| *G06F 21/56* | (2013.01) | |
| *H04L 12/24* | (2006.01) | |
| *H04L 12/707* | (2013.01) | |

(Continued)

(52) U.S. Cl.
CPC ........ *H04L 63/1466* (2013.01); *G06F 9/4406* (2013.01); *G06F 9/542* (2013.01); *G06F 21/552* (2013.01); *G06F 21/554* (2013.01); *G06F 21/565* (2013.01); *G06F 21/566* (2013.01); *H04L 41/069* (2013.01); *H04L 45/22* (2013.01); *H04L 63/1416* (2013.01); *H04L 63/1425* (2013.01); *H04L 63/1441* (2013.01); *H04L 63/20* (2013.01); *H04L 63/308* (2013.01); *G06F 2221/033* (2013.01); *G06F 2221/034* (2013.01); *H04L 61/1511* (2013.01)

(58) Field of Classification Search
CPC .... G06F 21/566; G06F 21/565; G06F 21/554; G06F 9/4406; G06F 2221/034; G06F 9/542; G06F 21/552; H04L 63/1425; H04L 63/1466; H04L 41/069; H04L 45/22; H04L 63/20; H04L 63/1441; H04L 63/308; H04L 63/1416
See application file for complete search history.

(56) References Cited

U.S. PATENT DOCUMENTS 7,934,261 B1 * 4/2011 Saguiguit .............. G06F 21/565
726/24
9,367,579 B1 * 6/2016 Kumar .............. G06F 17/30371
(Continued)

*Primary Examiner* — Mary Li
(74) *Attorney, Agent, or Firm* — Larson Newman, LLP

(57) ABSTRACT

A system for collection and analysis of forensic and event data comprising a server and an endpoint agent operating on a remote system. The server is configured to receive event data including process creation data, persistent process data, thread injection data, network connection data, memory pattern data, or any combination thereof, and analyze the event data to detect compromises of a remote system. The endpoint agent is configured to acquire event data, and communicate the event data to the server.

19 Claims, 11 Drawing Sheets

(51) Int. Cl.
*G06F 9/44* (2018.01)
*G06F 9/54* (2006.01)
H04L 29/12 (2006.01)

(56) References Cited

U.S. PATENT DOCUMENTS

2013/0167236 A1* 6/2013 Sick ...................... G06F 21/552
 726/24
2013/0312098 A1* 11/2013 Kapoor ................... G06F 21/56
 726/24

* cited by examiner

SYSTEM AND METHOD FOR DETECTING AND MONITORING PERSISTENT EVENTS

CROSS-REFERENCE TO RELATED APPLICATIONS

This application claims priority to U.S. Provisional Patent Application No. 62/297,612, filed on Feb. 19, 2016.

Related subject matter is contained in co-pending U.S. patent application Ser. No. 15/436,215 entitled "System and Method for Collection and Analysis of Endpoint Forensic and Event Data," filed of even date herewith, the disclosure of which is hereby incorporated by reference.

Related subject matter is contained in co-pending U.S. patent application Ser. No. 15/436,277 entitled "System and Method for Collection of Forensic and Event Data," filed of even date herewith, the disclosure of which is hereby incorporated by reference.

Related subject matter is contained in co-pending U.S. patent application Ser. No. 15/436,286 entitled "System and Method for Detecting and Monitoring Network Communication," filed of even date herewith, the disclosure of which is hereby incorporated by reference.

Related subject matter is contained in co-pending U.S. patent application Ser. No. 15/436,295 entitled "System and Method for Detecting and Monitoring Process Creation," filed of even date herewith, the disclosure of which is hereby incorporated by reference.

Related subject matter is contained in co-pending U.S. patent application Ser. No. 15/436,301 entitled "System and Method for Detecting and Monitoring Thread Creation," filed of even date herewith, the disclosure of which is hereby incorporated by reference.

FIELD OF THE DISCLOSURE

The present disclosure generally relates to information handling systems, and more particularly relates to systems and methods for collection and analysis of endpoint forensic and security event data.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

A system for collection and analysis of forensic and event data comprising a server and an endpoint agent operating on a remote system. The server is configured to receive event data including process creation data, persistent process data, thread injection data, network connection data, memory pattern data, or any combination thereof, and analyze the event data to detect compromises of a remote system. The endpoint agent is configured to acquire event data, and communicate the event data to the server.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
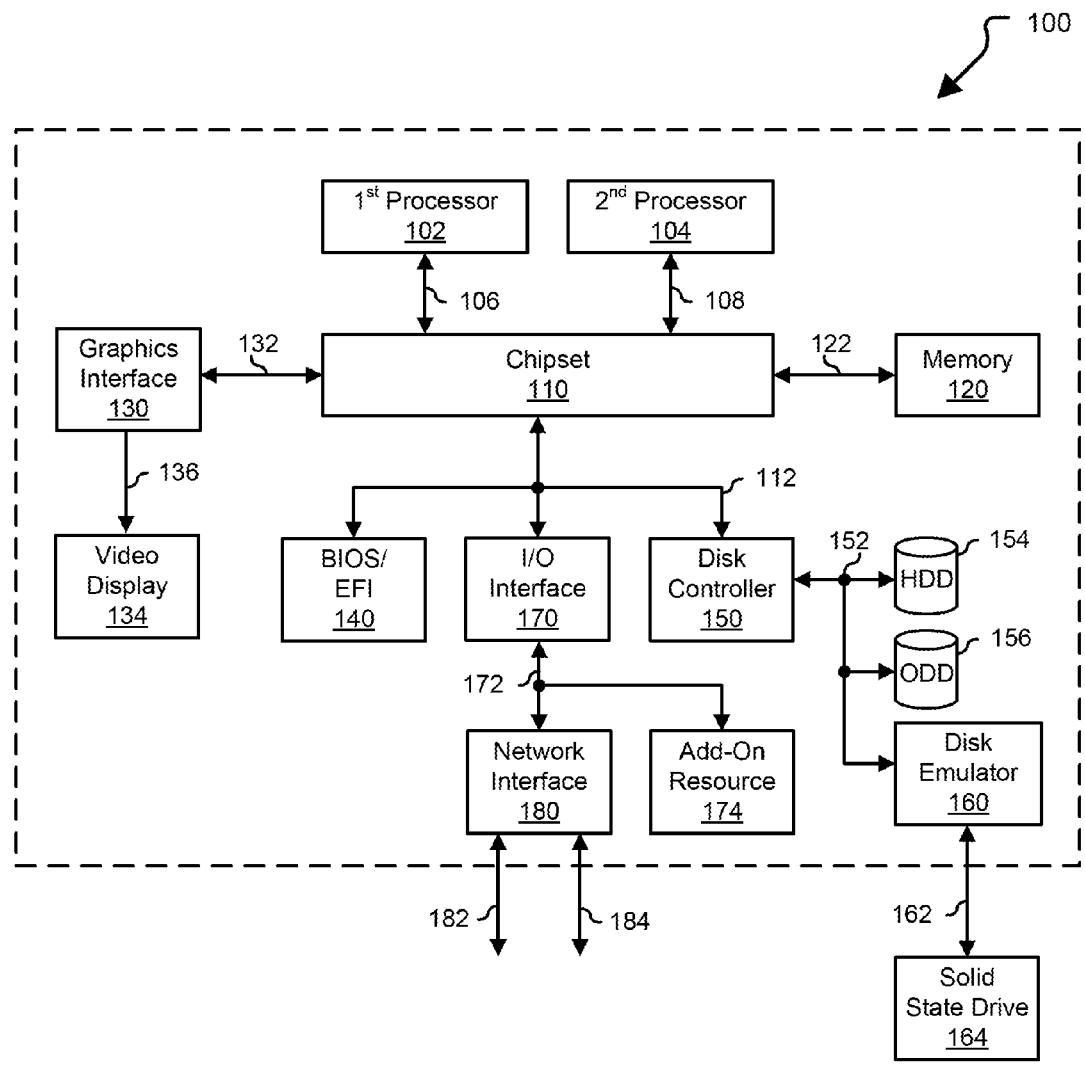
FIG. 1 is a block diagram illustrating an information handling system according to an embodiment of the present disclosure.

FIG. 1 illustrates a generalized embodiment of information handling system 100. For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 can include devices or modules that embody one or more of the devices or modules described above, and operates to perform one or more of the methods described above. Information handling system 100 includes a processors 102 and 104, a chipset 110, a memory 120, a graphics interface 130, include a basic input and output system/extensible firmware interface (BIOS/EFI) module 140, a disk controller 150, a disk emulator 160, an input/output (I/O) interface 170, and a network interface 180. Processor 102 is connected to chipset 110 via processor interface 106, and processor 104 is connected to chipset 110 via processor interface 108. Memory 120 is connected to chipset 110 via a memory bus 122. Graphics interface 130 is connected to chipset 110 via a graphics interface 132, and provides a video display output 136 to a video display 134. In a particular embodiment, information handling system 100 includes separate memories that are dedicated to each of processors 102 and 104 via separate memory interfaces. An example of memory 120 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 140, disk controller 150, and I/O interface 170 are connected to chipset 110 via an I/O channel 112. An example of I/O channel 112 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 110 can also include one or more other I/O interfaces, including an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. BIOS/EFI module 140 includes BIOS/EFI code operable to detect resources within information handling system 100, to provide drivers for the resources, initialize the resources, and access the resources. BIOS/EFI module 140 includes code that operates to detect resources within information handling system 100, to provide drivers for the resources, to initialize the resources, and to access the resources.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits a solid-state drive 164 to be connected to information handling system 100 via an external interface 162. An example of external interface 162 includes a USB interface, an IEEE 1134 (Firewire) interface, a proprietary interface, or a combination thereof. Alternatively, solid-state drive 164 can be disposed within information handling system 100.

I/O interface 170 includes a peripheral interface 172 that connects the I/O interface to an add-on resource 174 and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a NIC disposed within information handling system 100, on a main circuit board of the information handling system, integrated onto another component such as chipset 110, in another suitable location, or a combination thereof. Network interface device 180 includes network channels 182 and 184 that provide interfaces to devices that are external to information handling system 100. In a particular embodiment, network channels 182 and 184 are of a different type than peripheral channel 172 and network interface 180 translates information from a format suitable to the peripheral channel to a format suitable to external devices. An example of network channels 182 and 184 includes InfiniBand channels, Fibre Channel channels, Gigabit Ethernet channels, proprietary channel architectures, or a combination thereof. Network channels 182 and 184 can be connected to external network resources (not illustrated). The network resource can include another information handling system, a data storage system, another network, a grid management system, another suitable resource, or a combination thereof.

Collection and Analysis of Endpoint Forensic and Security Event Data

Many of todays targeted intrusions can involve advanced tools or adversaries that are using compromised credentials and system tools only without using malware to execute their mission. Existing solutions focus on detection of malware, exploits, or indicators associated with malware like command and control IP addresses and domains. Because of this very narrow focus, adversaries can bypass them leaving their targets blind and unaware of the threat to their sensitive systems and data.

Figure 2:
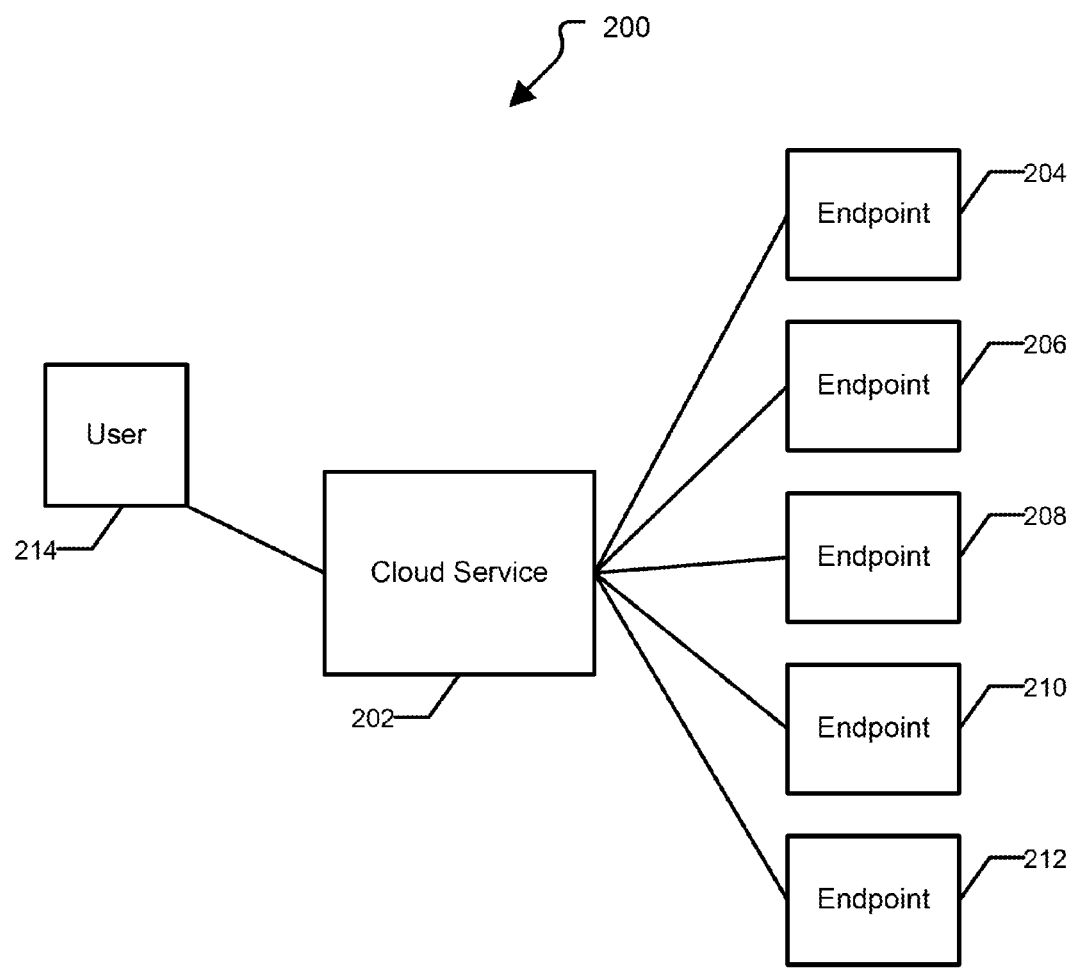
FIG. 2 is a block diagram illustrating a system for collection and analysis endpoint forensic and event data, in accordance with various embodiments.

FIG. 2 shows a system 200 for collection and analysis of endpoint forensic and event data. System 200 includes a cloud service 202 and endpoints 204, 206, 208, 210, and 212. User 214 can interact with the system 200 through the cloud service 202. Endpoints 204, 206, 208, 210, and 212 can include various information handling systems, such as information handling system 100. Endpoints 204, 206, 208, 210, and 212 can be configured for various purposes, such as a desktop or laptop computer, various servers, such as a web server, a database server, a storage server, an application server, or the like, and other configurations of an information handling system.

In various embodiments, an endpoint agent can be operable on each of endpoints 204, 206, 208, 210, and 212. The endpoint agent can gather information including forensic and event data and send the data to cloud service 202. The endpoint agent can be responsible for collecting both forensic data and event data. The endpoint agent can provide a comprehensive interpreted programming language allowing the creation of rich forensic inspection logic that enables the user to perform inspections of all system areas, such as the file system, the registry, the memory, the system and event logs, kernel objects and other sub-components of the information handling system. The agent can also record current system events such as process launches, network activity, persistence events, thread injections and authentication data. The modularity of the system can provide flexibility in feature deployment and also provides an extendable platform that allows for additional capabilities as new data types become necessary to detect adversary activity. Collecting both historic forensic artifacts and current activity can provide the data required by the cloud service to detect adversary behaviors and activity.

Cloud service 202 can perform an analysis of the information to identify hacks, intrusions, malicious code, and other compromises of the endpoint. Further, by correlating data across multiple endpoints, cloud service 202 can identify systematic attacks on network infrastructure. The cloud service 202 can focus on detection of known tactical indicators that represent past instances of adversary activity, strategic classes of activity that represent entire classes of adversary activity and behavioral detections that focus on correlation of events and forensic data to detect adversary behaviors at all stages of their intrusion cycle. Rather than rely on detection of malware, adversary tools and adversary infrastructure that can be identified through IPs, domains or network signatures, cloud service 202 can detect adversaries even when there are no known detections for their malware and even when they are not using malware at all but are instead using compromised credentials and common system utilities. The detections in cloud service 202 can focus on detection of adversary activity at all stages of the intrusion cycle including initial compromise, execution of malware, command and control, privilege escalation, credential theft and abuse, defensive evasion tactics, assessment and inventory of the environment and available data, lateral movement and data collection, exfiltration, and the like. Because of the many way system 200 can observe the adversary and the necessity of multiple actions for an adversary to accomplish their mission, system 200 can detect the adversary even if they evade some or even most of the detection tactics.

In various embodiments, user 214 can use a web interface of cloud service 202 to configure the endpoint agents, as well as to perform forensic analysis of one or more of endpoints 204, 206, 208, 210, and 212. Instructions, configuration files, additional modules, or the like can be sent from the cloud service to an endpoint agent. The endpoint agent can perform the requested tasks, such as installing a new module, implement the new configuration, or perform the instructions. Any results of the task can be sent back to the cloud service and communicated to the user.

Endpoint Agent

Figure 3:
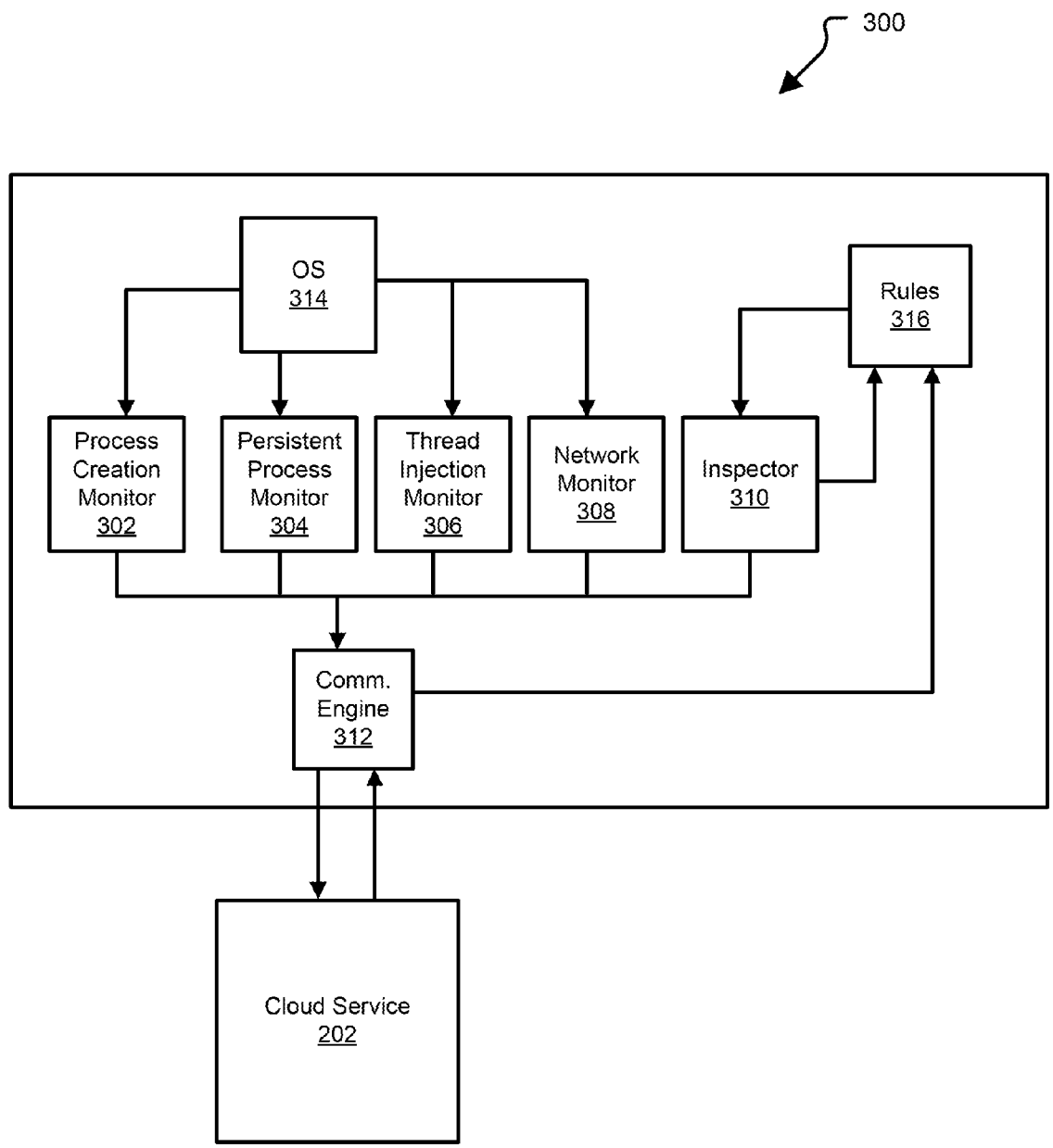
FIG. 3 is a block diagram illustrating a endpoint component for collection of forensic and event data, in accordance with various embodiments.

FIG. 3 is a block diagram showing the architecture of the endpoint agent 300. The endpoint agent 300 can include a process creation monitor 302, a persistent process monitor 304, a thread injection monitor 306, a network monitor 308, an inspector 310 and a communication engine 312.

The process creation monitor 302 can integrate with the operating system 314 to intercept process creation events. In various embodiments, the process can be created in a suspended state by operating system 314. The process creation monitor 302 can record the creation of the process, and may make a determination that the process is malicious and instruct the operating system 314 to terminate the process before the process is unsuspended. Alternatively, if the process is not determined to be malicious, the operating system 314 can unsuspended the process and the process can operate normally.

The persistent process monitor 304 can integrates with the operating system 314 to collect information on ways that malware may persist and changes to that information. For example, the persistent process monitor 304 can monitor scheduled tasks, driver events, windows registry, startup tasks, and the like to identify processes that will be launched automatically.

The thread injection monitor 306 can integrate with the operating system 314 to intercept thread injection events, such as when a malicious process creates a thread in another process. These events can be used to escalate privileges, access information that should remain hidden, and other malicious activities.

The network monitor 308 can integrate with the operating system 314 to collect metadata on network traffic flows and the results from any DNS queries made by the host.

The inspector 310 can perform rules 316. These rules can detect specific known malware behavior (tactical) and patterns of general malware behavior (strategic). The rules can be updated periodically through the communication engine 312.

The communication engine 312 can coordinate and update the software/configuration of other components and communicate bidirectionally with the cloud service 202. The communication engine 312 can install and updates services, programs and configuration for all components. The communication engine 312 can update rules 316. The communication engine 312 can receive and send data from the cloud service 202 and to the other components of the endpoint agent 300. In various embodiments, the communication engine 312 can start or stop other components, such as the process creation monitor 302, the persistent process monitor 304, the thread injection monitor 306, the network monitor 308, and the inspector 310, as well as setting resource utilization restrictions, such as memory, CPU, and disk restrictions for the other components. In various embodiments, the communication engine 312 can add or remove files, retrieve files, execute commands, add new modules, enable or disable modules, and the like.

Figure 4:
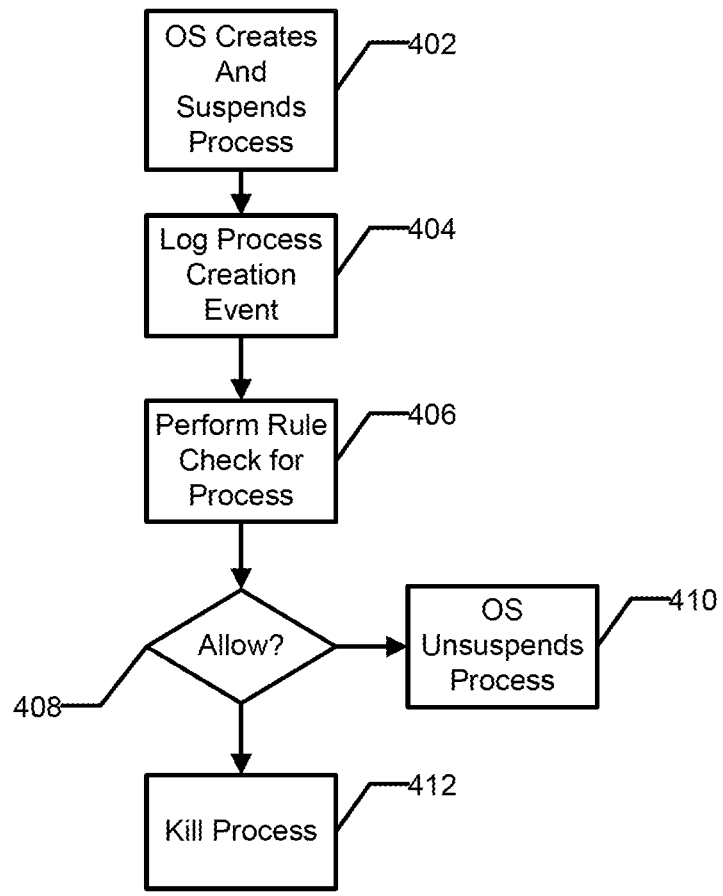
FIG. 4 is a flow diagram illustrating a method for monitoring process creation events, in accordance with various embodiments.

FIG. 4 is a flow diagram showing a method of monitoring process creation. At 402, the operating system can create and suspend a process. This may involve allocating memory resources to the process, loading code, and other tasks. The process can operating independently of the parent process that requested the new process to be created.

In various embodiments, a routine can intercept process creation, forcing the new process to wait for a response from the process creation monitor. The process can be suspended until the response is received.

At 404, the process creation event can be logged, and at 406, a rule check can be performed for the process. The rule check can include reviewing information such as the identity of the parent process, a hash of the executable, the command line used for launching the process, a call stack, and the like. Based on the rule check, it can be determined if the process should be allowed to continue, as shown at 408.

If the process is allowed to continue, such as when the rule check does not identify the process as malicious or compromised, the process can be unsuspended, as shown at 410. For example, the process creation monitor can provide a response to the waiting process, allowing it to continue.

Alternatively, if the rule check identifies the process as malicious or compromised, the process creation monitor may not provide the response to the waiting process and may issue an instruction to the operating system to kill the process instead, as shown at 412.

In various embodiments, it may be necessary to determine the execution target to understanding the nature of an event. In many cases, it may not be the initial target of an execution that garners the most interest. For example, a command prompt or shell can often be used to start a process. While the command prompt is a legitimate executable that does not warrant much attention, it can be used to execute another binary file that ultimately initiates the attack. If the event metadata is collected in a way that the information linked only to the command prompt file, it may not trigger alerts.

Properly identifying both the program that initiated the execution (host program) and the secondary target of the execution allows proper assessment of the event. If the full target information can be identified, this can allows internal tool to read the file, collect metadata information, such as attributes, checksum values, or other file specific information, that can be used for analysis of the file against internal or third-party annotation services that may have additional context on the file.

Target determination can be important when attempting to understand and assess process execution or persistence events that use legitimate binaries to launch illegitimate commands on a system. For many forensic analysts, the appearance of a legitimate executable may not garner much interest. However identifying and processing the full command and identify any subsequently affected files may help an analysts better understand the effects of the command on the system.

This becomes especially important in attacks where the use of legitimate binaries is the tool of choice to obfuscate activity on a system. In my cases, security tools may look at the execution of a binary as the security event, and the subsequent target of the event is not properly logged or analyzed. In order to properly assess an event, both the initiator and the target need to be analyzed. In the case of a command like Windows PowerShell (powershell.exe), the tool can be used to execute other programs or scripts. If the security tool attempts to assess an event like Windows PowerShell being executed on a system as the "event", they may miss the target of the PowerShell command, which is actually a script used to perform the malicious activity.

Identifying the full command information and associated targets of a command is integral to understanding the full impact of a command on a system and will aid an analyst's ability to assess a threat outside of the initially affected binary.

Figure 5:
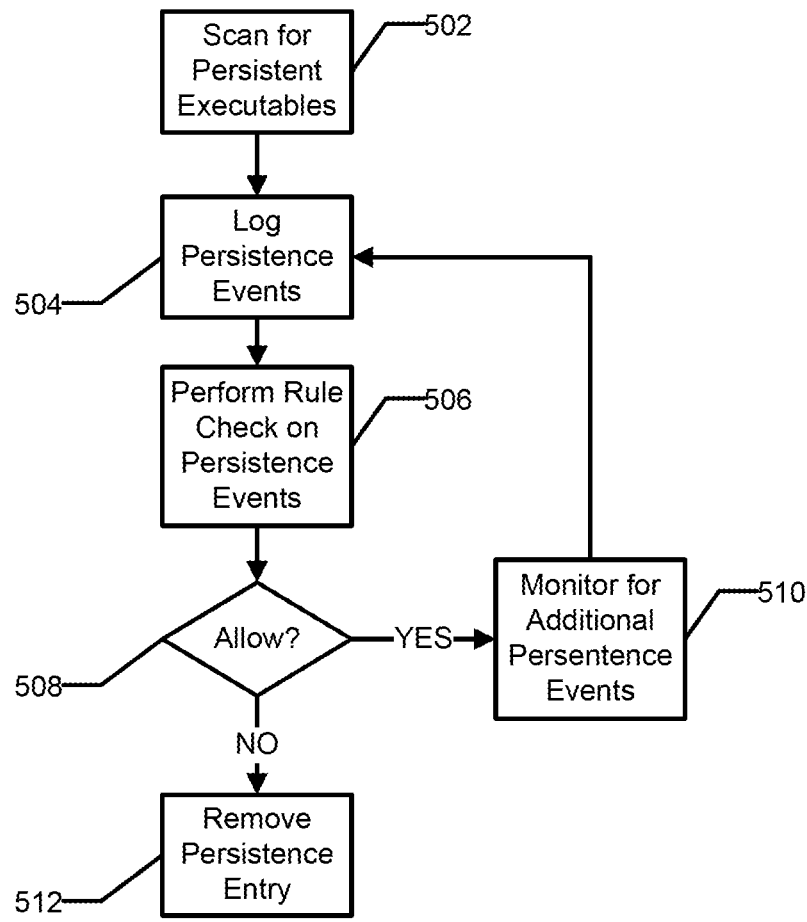
FIG. 5 is a flow diagram illustrating a method for monitoring persistent programs, in accordance with various embodiments.

FIG. 5 is a flow diagram showing a method of identifying persistent executables. At 502, the endpoint agent, such as through persistent process monitor 304, can scan for persistent executables, such as by inspecting persistence locations. Persistence locations can include configuration files, registry entries, drivers, and other locations where an executable can be launched automatically. Executables can be launched when the information handling system boots, when a user logs in, when certain trigger events occur, or similar circumstances. The persistent process monitor can identify all such executables that are configured to be automatically launched.

At 504, persistence events can be logged. This can include identifying the program to be automatically launched, the mechanism by which the program will be automatically launched, and other pertinent information.

At 506, the persistent process monitor can perform a rule check on the executable. At 508 a determination can be made, such as based on the results of the rule check, as to allowing the executable to continue to be automatically launched.

At 510, when an executable is determined to be allowed persistence, such as when the rule check does not identify the executable as malicious or compromised, the persistence entry can remain and the persistent process monitor can monitor for additional persistence events, such as by monitoring changes in the persistence locations, as indicated at 510. When additional events are identified, the persistent process monitor can log the persistence events at 504.

Alternatively, when an executable is not allowed persistence, such as when the executable is identified by the rule check to be malicious or compromised, the persistence entry can be removed, as indicated at 512.

In various embodiments, the persistent process monitor can maintain a list of persistent events that have been logged or reported to the cloud service. When a new event is identified, the persistent process monitor can compare the event to previously identified events and only report new events. For example, monitoring for additional persistence events can be trigger by a change in when or how an executable is triggered to automatically launch. If the executable has already been logged, reporter, or otherwise determined allowable, it may not be necessary to report the new event.

Figure 6:
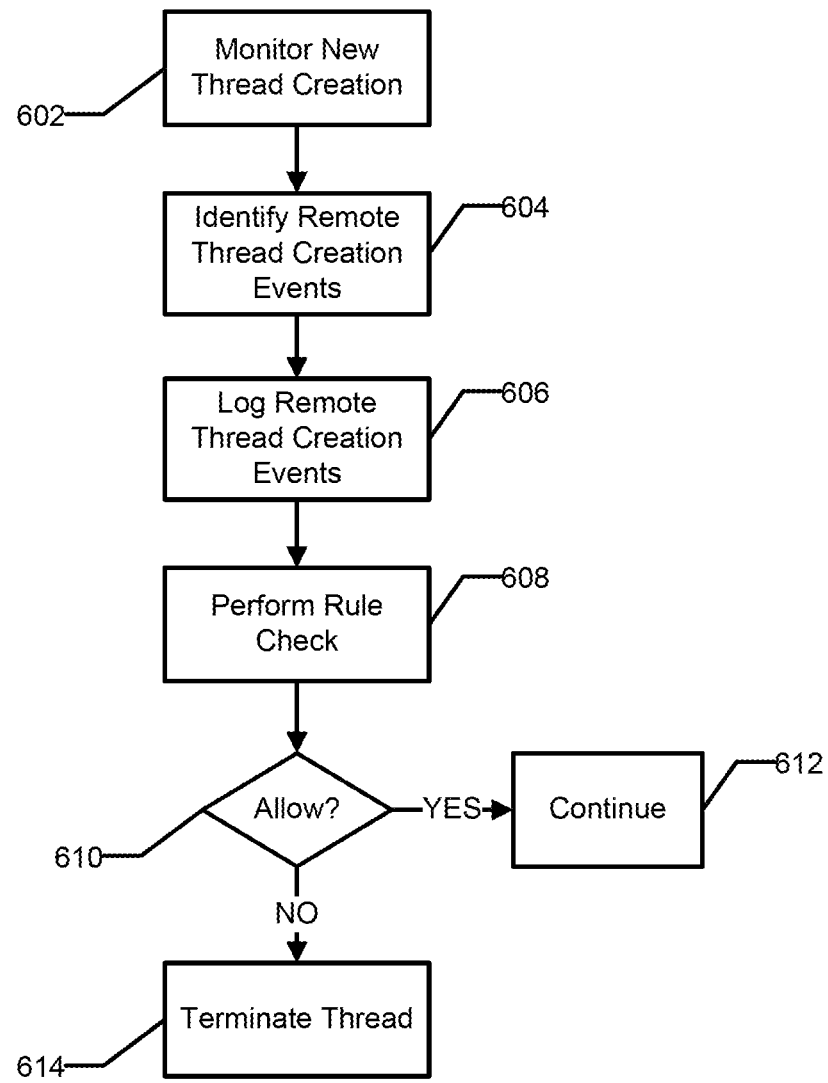
FIG. 6 is a flow diagram illustrating a method for monitoring remote thread injection events, in accordance with various embodiments.

FIG. 6 is a flow diagram illustrating a method of monitoring thread injection. In various embodiments, one process may initiate a thread within another process. This mechanism may be used maliciously to escalate privileges, intercept plain text passwords or other clear information that would otherwise be encrypted, and other malicious activities.

At 602, the endpoint agent, such as through thread injection monitor 306, can monitor new thread creation or thread injection, and at 604, remote thread injection event can be identified. Remote thread injection events can be identified by comparing the target process for the new thread with the creating process. When the target process and the creating process are different, the new thread can be flagged as a remote thread injection event.

At 606, remote thread injection events can be logged, and, at 608, a rule check can be performed. In various embodiments, logging of the remote thread injection event may include information about the source and target process, as well as a portion of the data stored at the start address of the thread. Logging may also include the path for any mapped memory referenced by the start address. In various embodiments, the rule check can identify the process performing the remote thread injection, as well as the process being injected. In various embodiments, the rule check can include a set of protected processes for which no remote thread injection is allowable. Additionally, the rule check may determine, such as based on the process performing the remote thread injection, the privileges of the injecting process and the injected process, and other factors, if the remote thread injection should be allowed, as indicated at 610.

When the determination is made to allow the remote thread injection, the new thread may be allowed to continue, as indicated at 612. Alternatively, when the determination is made not to allow the remote thread injection, such as when the injecting process is determined to be malicious or compromised, the injected thread may be terminated, as indicated at 614. Additionally, it may be desirable to terminate the injecting process to prevent further attempts at remote thread injection.

Figure 7:
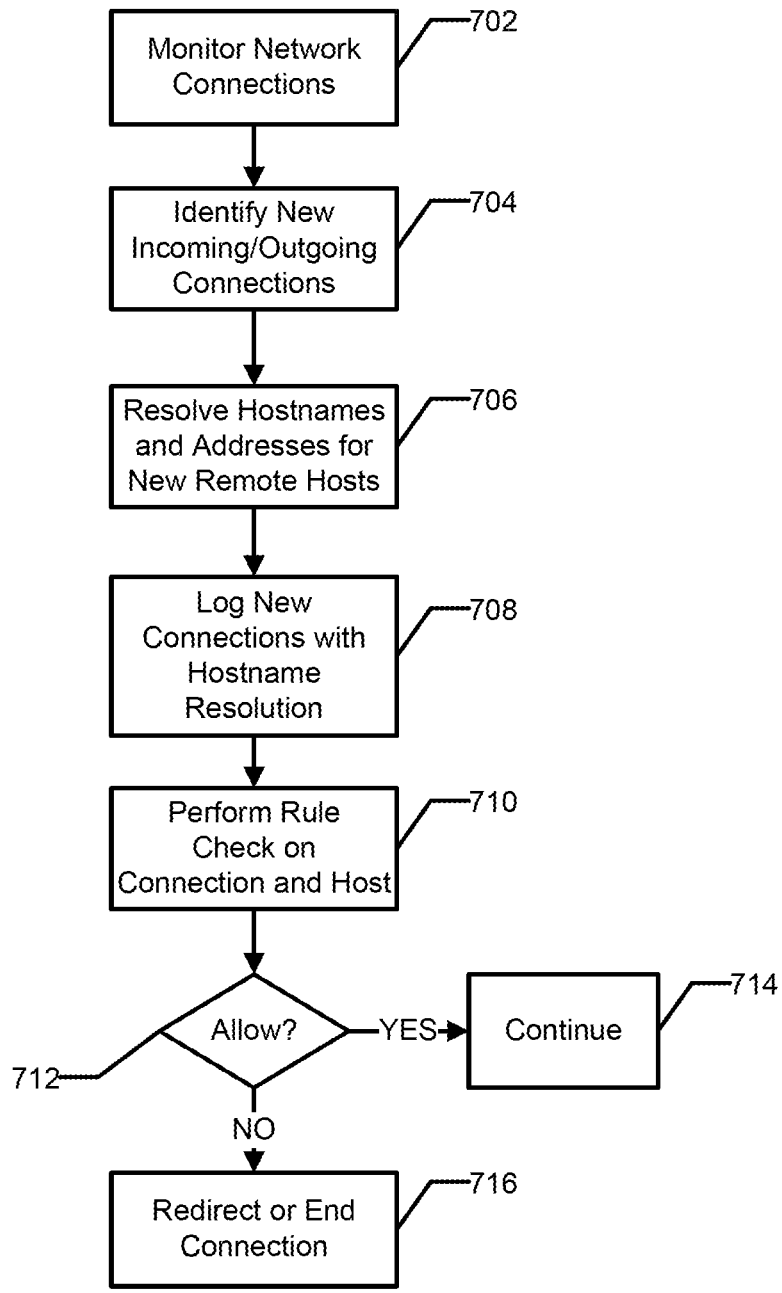
FIG. 7 is a flow diagram illustrating a method for monitoring network connections, in accordance with various embodiments.

FIG. 7 is a flow diagram illustrating a process of monitoring network connections. At 702, the endpoint agent can monitor network connections, such as through the network monitor 308. In various embodiments, the network monitor can monitor new TCP connections, DNS queries, UDP traffic flows, and the like.

At 704, the network monitor can identify new connections, including both incoming and outgoing connections. In various embodiments, the network monitor can track network flows, such as by a netflow ID. When a new network flow is initiated, such as when the netflow ID does not match a netflow ID stored in a table of network flows, the network monitor can add the new flow to a table.

Additionally, at 706, the network monitor can resolve hostnames and addresses for new remote hosts. For example, the network monitor can monitor domain name service (DNS) queries. Queries for new hosts (those not already cached by the operating system) can be recorded and time stamped. In particular embodiments, the network monitor can also perform lookups for unknown hosts, such as by performing a reverse lookup of an IP address that is not mapped to a hostname.

At 708, new connections can be logged, and hostname resolution for the connection can be recorded. In various embodiments, hostname resolution may differ over time or by location. For example, a load balancing service provider may provide different IP address for a hostname resolution in order to balance the load across multiple systems. Thus, the IP address provided may be different on a different system or at a different time. This can give rise to issues when trying to resolve a hostname at a later time. By tracking the new connection and the hostname resolution together, dynamically changing hostname resolution can be resolved correctly.

In some instances, the new flows and new DNS entries may be tagged as not having been sent to the cloud service. Periodically, the endpoint agent may send new flows (all flows tagged as not having been sent) to the cloud service and update the tags to reflect they have been sent to the cloud service. This may avoid sending duplicate entries to the cloud service.

At 710, the network monitor can perform a rule check on the connection and host. In various embodiments, attributes of a host or connection can be compared to lists of attributes of known good or known bad hosts and connections to identify connections or hosts that may be malicious.

At 712, a decision can be made regarding allowing the connection. If the determination is to allow the connection, the connection can be allowed to continue, as indicated at 714. Alternatively, if the connection is determined to be malicious or otherwise undesirable, the connection can be redirected or ended.

Figure 8:
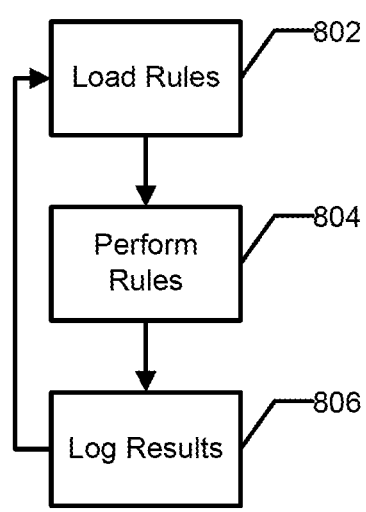
FIG. 8 is a flow diagram illustrating a method for inspecting an endpoint for forensic and event data, in accordance with various embodiments.

FIG. 8 is a flow diagram illustrating a method of inspecting a system for forensic analysis. At 802, the endpoint agent can load or update a set of rules. In various embodiments, the rules can include a set of instructions to be performed during the analysis. For example, one rule may identify the presence of malicious code based on a signature for that malicious code, such as a specific mutex used to prevent multiple infections or the malicious code from running multiple instances.

At 804, the endpoint agent, such as through the inspector 310, can perform the rules. In various embodiments, each rule can be executed and the results logged, as indicated at 806.

In various embodiments, the endpoint agent can periodically update the rules and perform additional scans of the system, such as by returning to 802.

Figure 9:
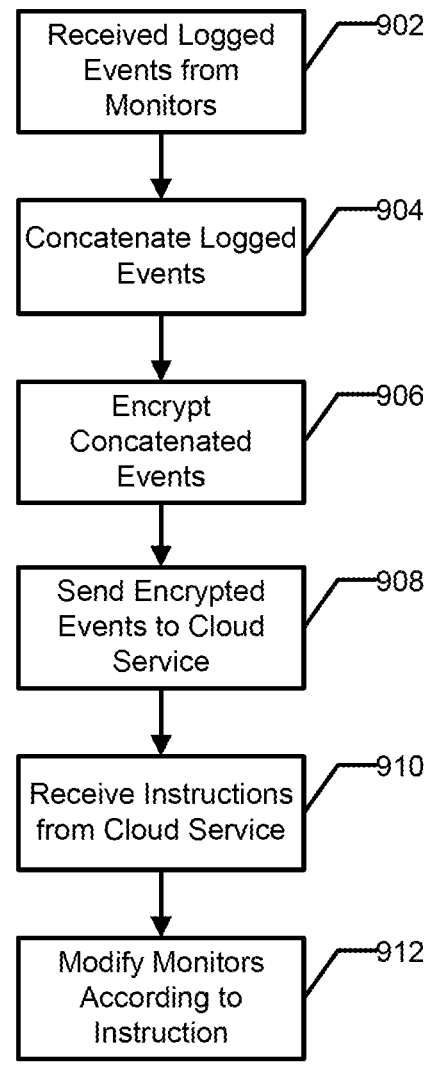
FIG. 9 is a flow diagram illustrating a method for communication endpoint forensic and event data to a cloud service, in accordance with various embodiments.

FIG. 9 is a flow diagram illustrating a method of communicating with a cloud service, such as cloud service 202. At 902, the communications engine of the endpoint agent can receive logged events from the monitors, such as process creation monitor 302, persistent process monitor 304, thread injection monitor 306, network monitor 308, and inspector 310. The information can be stored in a language-neutral, platform-neutral, extensible mechanism for serializing structured data, such as Google protocol buffers. The logged events data from the various monitors can be concatenated and serialized into the same buffer, as indicated at 904.

At 906, the communication engine can encrypt the concatenated data, such as to prevent eavesdropping. In various embodiments, the data may also be cryptographically signed so that the cloud service has assurance the data is not tampered with and the data is from the endpoint.

At 908, the communication engine can send the encrypted data to the cloud service. Additionally, at 910, the communication engine can receive instructions from the cloud service. In various embodiments, the instructions from the cloud service can be encrypted as well as cryptographically signed. Once received, and decrypted, the endpoint agent can modify the monitors in accordance with the instructions from the cloud service, as indicated at 912. For example, the instructions may provide updated configurations, enable or disable one or more monitors, require downloading of an updated version of one or more of the monitors, or the like.

In various embodiments, the endpoint agent can be located behind a firewall and require the use of a proxy to reach the cloud service. The communication agent can access various operating system configuration files to determine proxy information that can be used to reach the cloud service. In other embodiments, and in conjunction with the network monitor, the endpoint agent can identify proxy addresses, gateways, and network paths being actively used by other processes for communicating beyond the firewall.

In various embodiments, the communication between the communication engine and the cloud service can be over a protocol that is tolerant of long delays between communications. For example, the information handling system running the endpoint agent may be offline, suspended, shutdown, or otherwise unreachable for a period of time. During that time, the endpoint agent may store any logged events for later transmission to the cloud service. When connectivity is restored, the endpoint agent can check in with the cloud service and send the accumulated event log, as well as receive any pending instructions. To accomplish this, both the communication agent and the cloud service need to track what information needs to be sent (the new event logs in the case of the communication agent and the instruction updates in the case of the cloud service) and be able to quickly reauthenticate and reestablish a connection. Thus, the protocol can maintain state information regarding the status last communication between the endpoint agent and the cloud service without maintaining a stateful connection between the two.

In various embodiments, the endpoint agent can monitor the activity on the information handling system. The endpoint agent may suspend or deprioritize one or more monitors in the event the information handling system is overloaded. In particular embodiments, the endpoint agent can monitor disk IO queue depth as an indicator of activity. When the queue depth is large or growing, indicating the information handling system in performing more reads or writes that the disk IO can handle, the endpoint may suspend one or more monitors to reduce demand on system resources. Alternatively, when the queue depth is small or shrinking, indicating the disk IO can handle more reads or writes than are currently being, the endpoint agent can unsuspend any monitors that have been suspend.

In various embodiments, updates to the various monitors and engines can be performed. Upon receipt of an update instruction, the instruction can be acknowledge to prevent a failed or in-progress update from being attempted again. The update can be downloaded, and then monitor processes can be stopped while new module binaries are installed. In particular embodiments, if an update to the communication engine is included, the updated communication engine can be stored as a new executable in an alternate location, such as commengine_new instead of commengine. The endpoint agent can be restarted with the old version of the communication engine. The old communication engine can launch a child process with the new version of the communication engine and monitor the progress. The new version can establish a connection to the cloud service, and once the connection is established, move the old executable to another location (such as commengine_old) and the new executable to the primary location (commengine). Once this is complete, both the over version and the new version can terminate and the new version can be relaunched from the primary location. Additionally, when an old executable is present, it can be deleted when the endpoint agent restarts.

Cloud Service

Figure 10:
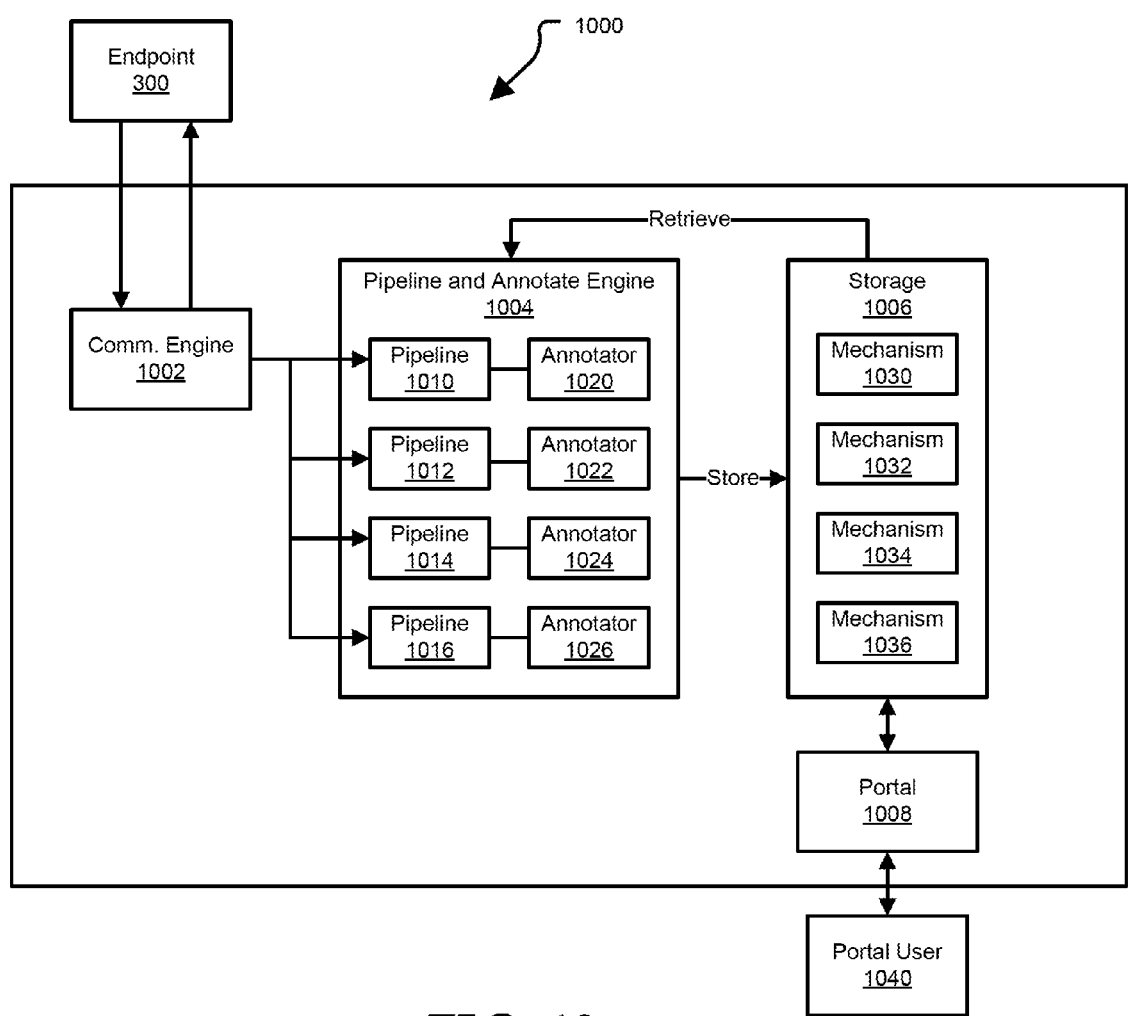
FIG. 10 is a block diagram illustrating a cloud service for analysis of endpoint forensic and event data, in accordance with various embodiments.

FIG. 10 is a block diagram showing the architecture of the cloud service 1000. The cloud service 1000 can include a communications engine 1002, a pipeline and annotate engine 1004, a storage 1006, and a portal 1008.

The communication engine 1002 can authenticate connections from endpoint agents, such as endpoint agent 300, and can handle communication with the endpoint agents. The communication engine 1002 can route data received from endpoints to the appropriate pipeline handlers of the pipeline and annotate engine 1004. Additionally, the communication engine 1002 can send software and configuration updates to the endpoints. In various embodiments, the communication engine 1002 can communicate with the endpoints over a modified HTTPS protocol using Google protocol buffers.

The pipeline and annotate engine 1004 can include multiple pipeline handlers 1010, 1012, 1014, and 1016 and annotators 1020, 1022, 1024, and 1026.

There can be one or more pipeline handlers for each type of data that is received from the endpoint agents, such as logs from the process creation monitor 302, persistent process monitor 304, thread injection monitor 306, network monitor 308, and inspector 310. When there are multiple pipeline handlers for a specific type of data, they can be run sequentially.

Pipeline handlers can analyze and process the data, then can decide to perform actions, such as look up additional data from storage 1006, record data in storage 1006, and queue work for an annotator.

There can be annotators for each type of data that is received from the endpoint agents, such as logs from process creation monitor 302, persistent process monitor 304, thread injection monitor 306, network monitor 308, and inspector 310. Annotators can receive requests from pipeline handlers (which may or may not wait for a response), can run additional computations/look up additional data and can then store the results. For example, an annotator can send a hash of a file to a virus signature repository for comparison to known viruses, look up additional information on a process and store results, and the like.

Storage 1006 can include multiple storage mechanisms 1030, 1032, 1034, and 1036. In various embodiments, the mechanisms can include an in memory key/value store, a data store for long term storage that supports quick full text searches, a distributed cloud storage to store files such as agent packages, a non-relational based primary data store for long term storage, and the like.

Portal 1008 can be accessed by a user 1040 to interact with the system. Depending on the level of access provided to user 1040, user 1040 can configure/add endpoints, build or customize an installation for the endpoint, change and update inspector rules, run inspector rules to endpoints, and the like. Additionally, user 1040 can view the status of endpoints, perform basic configuration of endpoints, download an installation to an information handling system, and report on and view data stored by pipeline handlers and annotators, such as information on processes, threads, persistence data (files, registry entries, scheduled tasks, and the like), results from inspector rules, and the like.

Figure 11:
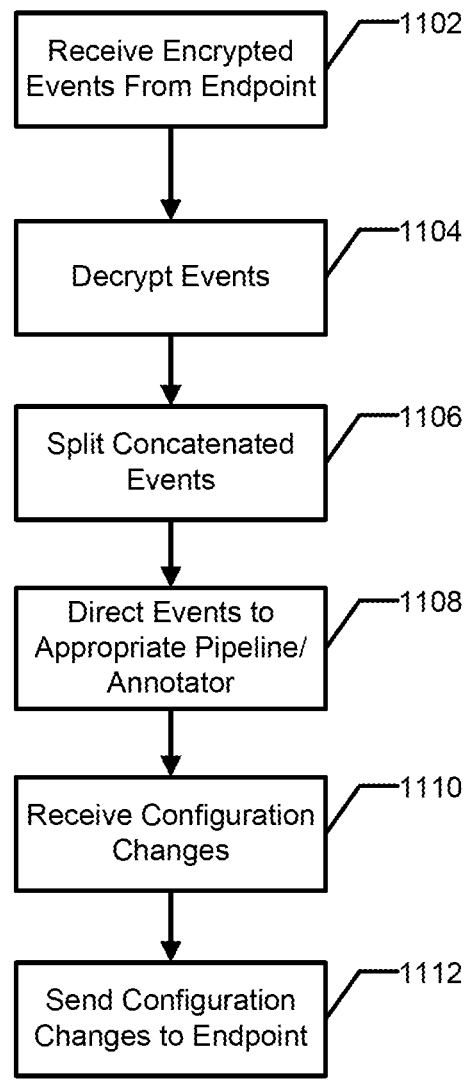
FIG. 11 is a flow diagram illustrating a method for receiving forensic and event data and controlling an endpoint agent, in accordance with various embodiments.

FIG. 11 is a flow diagram illustrating an exemplary method of communicating with a endpoint agent, such as endpoint agent 300. At 1102, the cloud service, such as through the communication engine 1002, can receive encrypted event information from an endpoint. At 1104, the communication engine can decrypt the event. Additionally, the communication engine may check a cryptographic signature to ensure the data is unaltered and that the event information is from the endpoint agent and not a malicious third party.

The communication engine can split concatenated events, as indicated at 1106, and direct event information to the appropriate pipeline and annotator, as indicated at 1108.

As shown at 1110, the communication engine can receive configuration changes, update directives, and other instructions for the endpoint, such as from the portal 1008. At 1112, the communication engine can send the configuration changes and other instructions to the endpoint. In various embodiments, the communication engine can encrypt and cryptographically sign the instructions prior to sending to the endpoint. Further, the communication engine can periodically send updated credentials and cryptographic keys to the endpoint, as well as revoke old credentials, in order to minimize the risk from a malicious actor cracking the cryptographic keys and posing as the endpoint or the cloud service.

In various embodiments, security events can be separated into static and unique components. Each security event, whether it is a process execution event, thread injection, or file information, can have unique characteristics that will only be represented in that event. This can include specific characteristics like timestamps, checksum values, paths, or other attributes to identify the event singularly. For many security products, events are analyzed individually meaning that the characteristics of the event are always treated as unique. For some events this can be sufficient for identifying threats or categorizing the activity. However, a subset of the attributes of an event can be abstracted and compared to other events previously collected with the same or similar attributes. The subset of information can include attributes such as filenames, file paths, registry paths or values, command-line arguments, checksums, or other notable attributes to generate a "static" (non-unique, but representative) value or hash. When this subset information is abstracted from an event and compared to the same subset of information from other events, it can be used to analyze similar events as a collective or through categorization, providing additional analysis information such as category, event frequency and references to other similar events that may have occurred on the same or other systems. This information can be used to better understand where similar events have been seen previously, as well as provide information on how common or uncommon the event may be. This information can then be used to better assess whether the event is a threat outside of indicators looking at the event individually.

Many security products can provide a mechanism to "scan" or perform a signature assessment of events, files, registry or other file system areas on a computer. The process of "scanning" is a common mechanism for looking for specific signatures. The signatures that are executed are often only looking for simple indicators and alert and log the events when they are identified. In various embodiments, the cloud service can instruct endpoint agents to "scan" systems looking for known threats (tactical signatures), and can also provide a mechanism to periodically assess a system for activity related to security vulnerabilities, misconfigurations or otherwise unknown security threats (strategic signatures). The information collected from either tactical or strategic signatures can be collected and uploaded to the cloud service where it can be assessed by one or more analysts.

Since the results of the "scans" are being periodically sent to the cloud service, and the endpoint agents are collecting information for known, suspicious and otherwise general system activity, the information from the "scans" can be used to assess the events over time. This allows an analyst to identify new events, not previously seen events that are no longer present, and events that may have appeared more than once throughout the life of "scans" on the system. This level of differential analysis can allow an analyst to see the evolution of activity on a system, and perform an assessment on events outside of a singular occurrence. In addition, differential analysis can also provides additional context to strategic alerts that may otherwise seem benign, but in the context of other correlated events has the context to perform a proper assessment.

Differential analysis through periodic scans coupled with Static/Unique data analysis can allows for the correlation of events across a plurality of endpoint agents, and can perform assessment of the result information across the different "scans" in which it was identified providing additional data points and context to alerts that would not be available in a singular scan.

In various embodiments, rule sets can enable endpoint agent monitors and the cloud service to categorize known good, known bad, and unknown events. For example, a security update to various system components may be identified as a known good event, whereas previously identified malware can be identified as a known bad event. Known good and known bad events can be easily handled by the endpoint agent, either by allowing or disallowing the activity. On the other hand, when an unknown event occurs, the endpoint agent may be unable to act on the event based on preexisting rules. The unknown events can be sent to the cloud service and flagged for further analysis. The cloud service can correlate unknown events with other events identified by other endpoints to aid in understanding the nature of the event. In particular embodiments, the event data and the correlations with other events can be presented to an analyst for further study. Once the nature of the event has been determined, updated rules sets can be propagated to the endpoints so that similar events can be handled appropriately.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality.

The information handling system can include memory (volatile (such as random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method of monitoring an information handling system, comprising:
   inspecting a persistence location to identify a persistent entry of an executable, the persistent entry causing the executable to be launched automatically when the information handling system boots, when a user logs in, or when a trigger event occurs;
   identifying a change in or addition of the persistent entry;
   determining if the persistent entry changes when or how the executable is triggered; and
   when the persistent entry is not a change in when or how a previously logged executable is triggered:
   logging the persistent entry of the executable;
   evaluating the executable based on a set of rules;
   determining the executable is malicious or compromised; and
   removing the persistent entry when the executable is determined to be malicious or compromised.

2. The method of claim 1, wherein the persistence location includes configuration files, registry entries, drivers, or any combination thereof.

3. The method of claim 1, wherein logging the persistent entry includes logging the executable to be automatically launched.

4. The method of claim 1, wherein logging the persistent entry includes logging a mechanism by which the executable will be automatically launched.

5. The method of claim 1, further comprising maintaining a list of executables with persistence entries that have been logged or reported to a cloud service, and comparing the executable to the list of executables with persistence entries.

6. The method of claim 5, wherein a change in when or how the executable is triggered does not result in an additional log entry.

7. An endpoint agent for monitoring persistent locations for malicious activity, comprising:
   a memory containing a set of instructions for a communications engine configured to:
   receive a set of rules from a cloud service; and
   send information about an executable with a new persistence entry to the cloud service; and
   a persistence process monitor configured to:
   identify the new persistence entry;
   determine the executable launched by the new persistence entry;
   determine if the new persistence entry changes when or how the executable is triggered; and
   when the new persistence entry is not a change in when or how a previously logged executable is triggered:
   log the new persistence entry and the executable;
   compare the executable to the set of rules;
   determine if the new persistence entry is allowable based on the comparison of the executable to the set of rules; and
   remove the new persistence entry if the new persistence entry is not allowable; and
   a processor for executing the instructions.

8. The endpoint agent of claim 7, wherein the new persistence entry causes the executable to be launched automatically when an information handling system boots, when a user logs in, or when a trigger event occurs.

9. The endpoint agent of claim 7, wherein a persistence location includes configuration files, registry entries, drivers, or any combination thereof.

10. The endpoint agent of claim 7, wherein logging the executable includes logging the program to be automatically launched.

11. The endpoint agent of claim 7, wherein logging the executable includes logging the mechanism by which the program will be automatically launched.

12. The endpoint agent of claim 7, further comprising maintaining a list of executables with persistence entries that have been logged or reported to a cloud service, and comparing the executable to the list of executables with persistence entries.

13. The endpoint agent of claim 12, wherein a change in when or how the executable is triggered does not result in an additional log entry.

14. A non-transitory computer-readable medium including code that when executed by a processor causes the processor to perform a method, the method comprising:

inspecting a persistence location to identify a persistent entry for an executable, the persistent entry causing the executable to be launched automatically when an information handling system boots, when a user logs in, or when a trigger event occurs;

identifying a change in or addition of the persistent entry;

determining if the persistent entry changes when or how the executable is triggered; and when the persistent entry is not a change in when or how a previously logged executable is triggered:

logging the persistent entry of the executable;

evaluating the executable based on a set of rules;

determining the executable is malicious or compromised by evaluating a behavior of the executable against known and general malware behavior patterns; and removing the persistent entry when the executable is determined to be malicious or compromised.

15. The non-transitory computer-readable medium of claim 14, wherein the persistence location includes configuration files, registry entries, drivers, or any combination thereof.

16. The non-transitory computer-readable medium of claim 14, wherein logging the persistent entry includes logging the executable to be automatically launched.

17. The non-transitory computer-readable medium of claim 14, wherein logging the executable includes logging the mechanism by which the program will be automatically launched.

18. The non-transitory computer-readable medium of claim 14, further comprising maintaining a list of executables with persistence entries that have been logged or reported to a cloud service, and comparing the executable to the list of executables with persistence entries.

19. The non-transitory computer-readable medium of claim 18, wherein a change in when or how the executable is triggered does not result in an additional log entry.

* * * * *